R. T. BARTON.
Holdback for Carriages.
No. 206,764.  Patented Aug. 6, 1878.
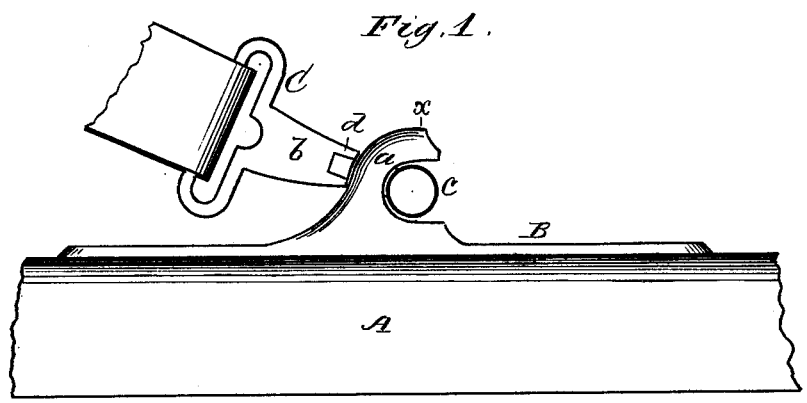
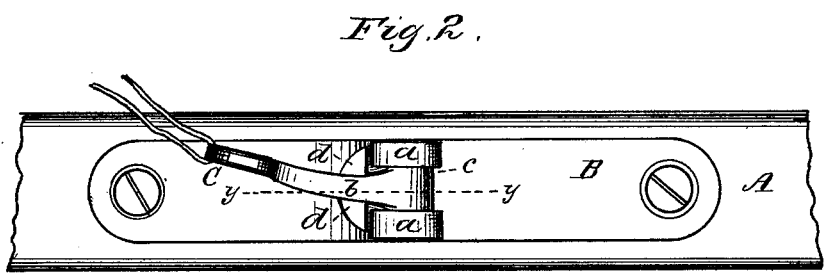
WITNESSES.
U. J. England.
H. W. Throckmorton.
INVENTOR.
Richard T. Barton.
per Chas. H. Fowler.
Attorney.

UNITED STATES PATENT OFFICE.

RICHARD T. BARTON, OF NEW HAVEN, CONNECTICUT.

IMPROVEMENT IN HOLDBACKS FOR CARRIAGES.

Specification forming part of Letters Patent No. 206,764, dated August 6, 1878; application filed July 5, 1878.

*To all whom it may concern:*

Be it known that I, RICHARD T. BARTON, of New Haven, in the county of New Haven and State of Connecticut, have invented a new and valuable Improvement in Holdbacks; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side elevation of my invention, and Fig. 2 is a top-plan view of the same.

This invention has relation to that class of devices known as "holdbacks," secured to a carriage-shaft, to which the breeching-strap is connected to enable the animal to hold back the vehicle; and the object of the present invention is to provide such a device simple in construction, durable, and not easily injured or broken by the strain thereon, as will be hereinafter described.

In the accompanying drawings, A represents a section of a shaft, to which a plate, B, of any suitable metal, is secured either by screws or other convenient means. The plate B is formed with arms $a$, one upon each side of the plate, and of sufficient distance apart to allow the insertion of the shank $b$ between the same. Upon one end of the shank $b$ is formed a hook, C, or other suitable device for connecting the breeching-strap, and upon the opposite end of the shank are the usual ears $c$, which fit within and against the inner sides of the arms $a$ at a suitable distance from the ears $c$, and upon each side of the shank $b$ are shoulders $d$. As the outer extremity of the arms form a segment of a circle, the highest point being at $x$, before the shank can be disconnected it will be necessary to bring it in a perpendicular position, so that the under side of the shoulders will be parallel with a line drawn from the highest point of the shank in either direction horizontally. This form of the arms $a$, together with the shoulders $d$ upon the shank, insures against the danger of accidental disconnection of said shank from the arms.

The shank $b$, as will be noticed, is curved in an outward direction or away from a horizontal line, $y$ $y$, as illustrated in Fig. 2. This outward curve in the shank $b$ prevents to a great extent the liability of its becoming broken by the strain thereon. It also enables the breeching-strap to draw in the direction of a straight line.

The several parts herein described may be made from malleable or wrought iron, or any other suitable metal desired. The shank may be turned right or left and connected with the arms $a$ in either way with the same results.

Having now fully described my invention, what I claim as new, and desire to secure by Letters Patent, is—

1. The combination, with the plate B and arms $a$, curved as shown and described, of the shank $b$, hook C, ears $c$, and the shoulders $d$, for the purpose set forth.

2. The plate B, formed with curved arms $a$, in combination with the shank $b$, curved as shown, and having the hook C, shoulders $d$, and ears $c$, substantially as and for the purpose described.

In testimony that I claim the above I have hereunto subscribed my name in the presence of two witnesses.

RICHARD T. BARTON.

Witnesses:
 JULIUS TUISS,
 P. F. KIERNAN.